(12) United States Patent
Lin et al.

(10) Patent No.: US 9,172,934 B2
(45) Date of Patent: Oct. 27, 2015

(54) METHOD FOR WHITE BALANCE ADJUSTMENT OF IMAGES

(71) Applicant: HON HAI PRECISION INDUSTRY CO., LTD., New Taipei (TW)

(72) Inventors: Kuo-Hung Lin, New Taipei (TW); Jyun-Siang Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 249 days.

(21) Appl. No.: 13/914,651

(22) Filed: Jun. 11, 2013

(65) Prior Publication Data

US 2014/0111665 A1    Apr. 24, 2014

(51) Int. Cl.
*H04N 9/73* (2006.01)
*H04N 1/46* (2006.01)
*G06K 9/00* (2006.01)

(52) U.S. Cl.
CPC ..................................... *H04N 9/735* (2013.01)

(58) Field of Classification Search
CPC ........... G06T 2207/10144; G06T 2207/10152; G06T 2207/20016; G06T 2207/20021; G06T 2207/20208; G06T 5/50; G06T 7/0026; H04N 5/23258; H04N 5/2351; H04N 5/2352; H04N 5/2355

USPC ................. 348/223.1; 358/516, 518; 382/162
See application file for complete search history.

(56) References Cited

U.S. PATENT DOCUMENTS

| | | | |
|---|---|---|---|
| 8,063,944 B2 * | 11/2011 | Kido | 348/222.1 |
| 2008/0130987 A1 * | 6/2008 | Stokes | 382/162 |
| 2008/0143844 A1 * | 6/2008 | Innocent | 348/223.1 |
| 2009/0268044 A1 * | 10/2009 | Gill | 348/222.1 |
| 2010/0259639 A1 * | 10/2010 | Hung et al. | 348/223.1 |
| 2012/0002082 A1 * | 1/2012 | Johnson et al. | 348/234 |

* cited by examiner

*Primary Examiner* — Trung Diep
(74) *Attorney, Agent, or Firm* — Novak Druce Connolly Bove + Quigg LLP

(57) ABSTRACT

A white balance adjustment method includes capturing a raw image by an image capturing device where an arrangement format of the raw image is BGb/GrR, a predetermined sampling width is used to sample RGB pixels, and obtaining color scale values of each channel. Each channel includes a first buffer space and a second buffer space, the first buffer space storing smaller color scale values, the second buffer storing larger color scale values, an average value of the minimum color scale values stored in the first buffer space is calculated to obtain a reference black, an average value of the maximum color scale values stored in the second buffer space is calculated to obtain a reference white. A color histogram stretching method using the obtained reference black and white adjusts the white balance of the raw image.

4 Claims, 5 Drawing Sheets

| B | Gb | B | Gb | B | Gb |
| --- | --- | --- | --- | --- | --- |
| Gr | R | Gr | R | Gr | R |
| B | Gb | B | Gb | B | Gb |
| Gr | R | Gr | R | Gr | R |
| B | Gb | B | Gb | B | Gb |
| Gr | R | Gr | R | Gr | R |

FIG. 3

METHOD FOR WHITE BALANCE ADJUSTMENT OF IMAGES

BACKGROUND

1. Technical Field

The present disclosure relates to an image processing technology, and in particular, to a white balance process for digital color images.

2. Description of Related Art

Generally speaking, colors that reflect off an object depend on color of the light sources. A human brain is able to detect and correct this type of color change. Whether during a sunny day, a cloudy day, or in a room with light bulbs or fluorescent lamps, a human eye can adapt to the changes in color under different light sources and it will not affect the way in which humans perceive white objects. However, "white color" generated by different light sources is perceived differently by a digital image capturing device. For example, a photo tends to be yellowish if it is taken in a room illuminated with tungsten lamps (light bulbs), and it tends to be lightly bluish or reddish if it is taken in other environments. In order to make the colors in the photos consistent with the colors perceived by human eye, the digital image capturing device has to mimic the human brain and adjust the colors according to the light source. It has to define the white color so that it is the same in the photos as it is in the white color perceived by the human eyes. This type of adjustment is known as "white balance."

In prior art, a color histogram stretching (CHS) method is used to adjust the white balance for the image, raw histograms of red (R), green (G), and blue (B) three channels are re-quantized to a range of 0-255, adjusted result shows that this method has characteristics with smaller error and immediacy. However, the color histogram stretching method needs a large memory space, to estimate a reference black and a reference white in the light sources. Therefore, it is necessary to provide a white balance adjustment method which requires less memory space.

BRIEF DESCRIPTION OF THE DRAWINGS

FIG. 3 is a schematic view of sub-pixels arrangement of a raw image.

DETAILED DESCRIPTION

Figure 1:
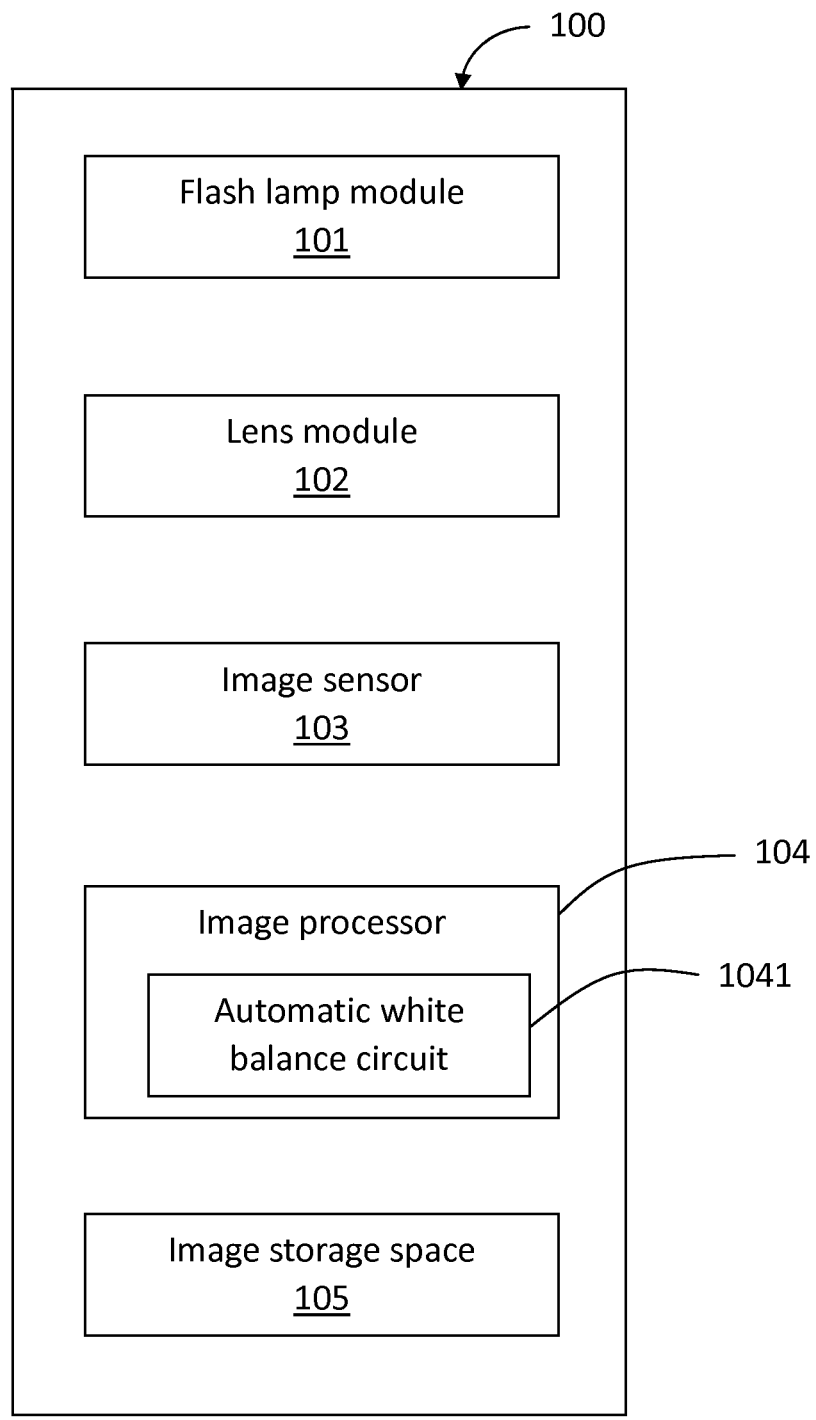
FIGS. 1 is an image capturing device using a white balance adjustment method of the present embodiment.

In FIG. 1, an image capturing device 100 using the white balance adjustment method of the present embodiment includes a lens module 102, an image sensor 103, a image processor 104, and an image storage space 105. The image sensor 103 is electrically connected to the image processor 104. The lens module 102 and the image sensor 103 cooperatively capture an image, the image processor 104 receives the image from the image sensor 103, and the image storage space 105 is used to store a processed image. The image storage space 105 may be physical storage space, such as flash memory or random access memory, or a cache. The image storage space 105 may be a non-transitory storage medium.

The image processor 104 includes an automatic white balance circuit 1041 to perform the white balance adjustment method of the present embodiment. The image capturing device 100 further includes a flash lamp module 101.

Figure 2A:
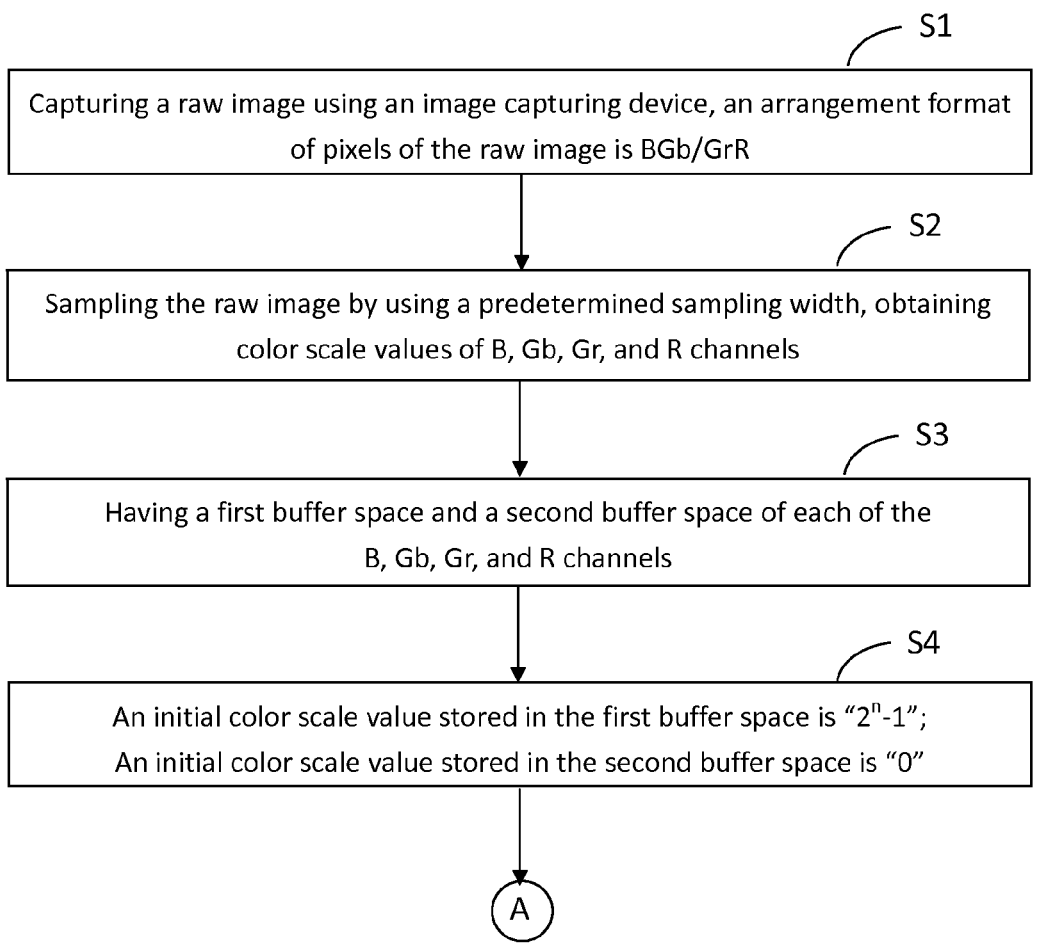
FIGS. 2A and 2B show a flowchart of the present embodiment of the white balance adjustment method.
Figure 2B:
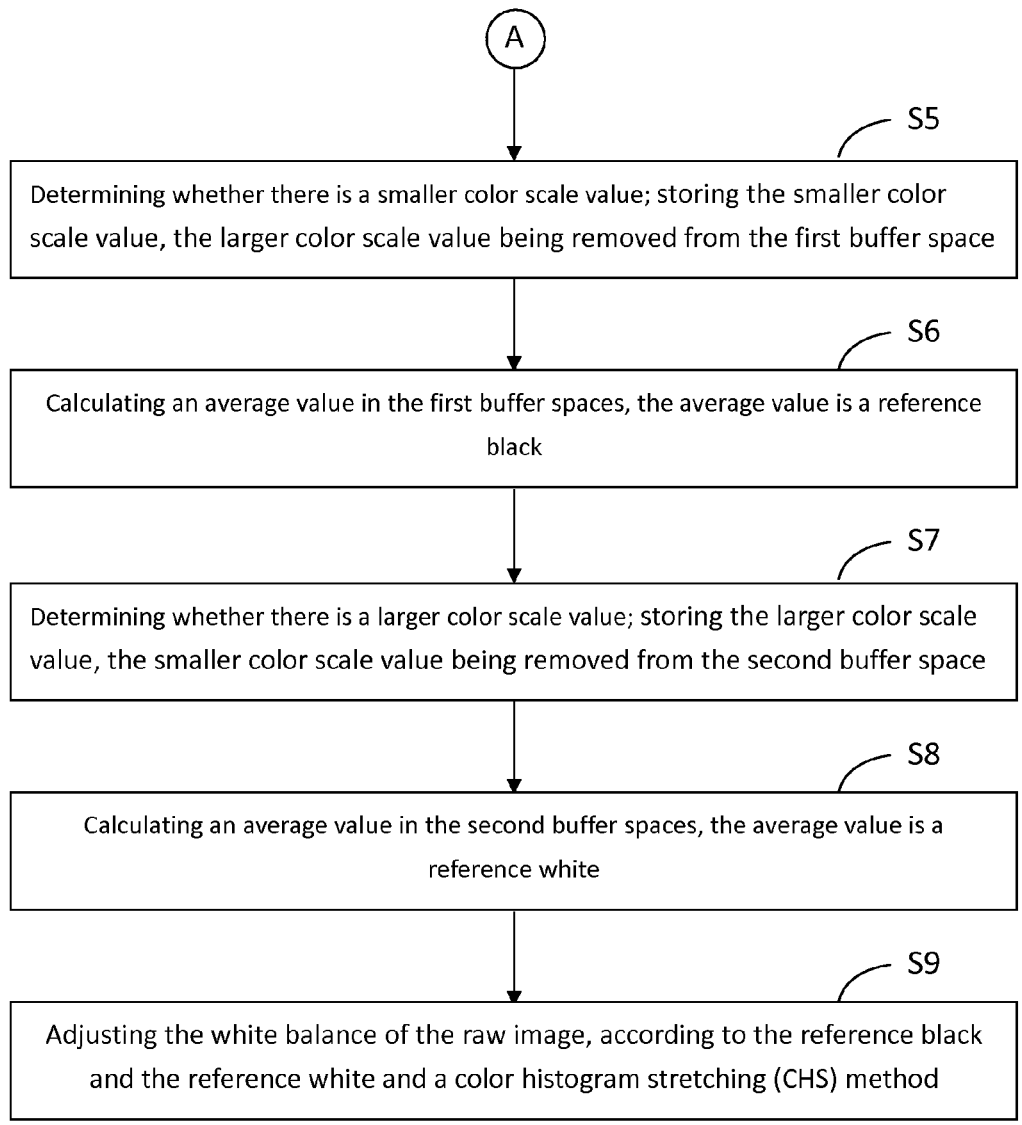

FIG. 2A and 2B show a flowchart of the present embodiment of the white balance adjustment method. In this embodiment, the white balance adjustment method is used to adjust white balance for an image. The white balance adjustment method for the image capturing device 100, includes the following steps:

In step S1, a raw image is captured by the image capturing device 100, the image includes a plurality of pixels, and each pixel is composed of red (R), green (G), and blue (B) sub-pixels. Each sub-pixel includes at least one color channel. The raw image is represented by R, G, and B color channels. The raw image is loaded, where an arrangement format of pixels of the raw image is BGb/GrR.

In step S2, the raw image is sampled by using a predetermined sampling width, to obtain color scale values of the B, Gb, Gr, and R channels.

In step S3, each of the B, Gb, Gr, and R channels includes a first buffer space and a second buffer space, the first buffer space is used to store a smaller color scale value, the second buffer space is used to store a larger color scale value.

In step S4, the first and the second buffer spaces are initialized, an initial color scale value stored in the first buffer space is $2^n-1$, an initial color scale value stored in the second buffer space is 0, where "n" is a number of bits of the pixel.

In step S5, separately determining whether there is a smaller color scale value of each of the B, Gb, Gr, and R channels than the color scale value stored in respective first buffer space; in response to the determining that there is the smaller color scale value in the B, Gb, Gr, and R channels, to store the smaller color scale value, and the larger color scale value being removed from the first buffer space.

In step S6, this process to be repeated until a comparison between all of the color scale values in the B, Gb, Gr, and R channels and the corresponding color scale values stored in the first buffer space is completed, and then calculating an average value of the color scale values stored in the first buffer spaces, the average value being a reference black.

In step S7, separately determining whether there is a larger color scale value of each of the B, Gb, Gr, and R channels than the color scale value stored in respective second buffer space; in response to the determining that there is the larger color scale value in the B, Gb, Gr, and R channels, to store the larger color scale value, the smaller color scale value being removed from the second buffer space.

In step S8, this process to be repeated until a comparison between all of the color scale values in the B, Gb, Gr, and R channels and the corresponding color scale values stored in the second buffer space is completed, and then to calculate an average value of the color scale values stored in the second buffer spaces, the average value being a reference white.

In step S9, according to the reference black and the reference white, and using a color histogram stretching (CHS) method to adjust the white balance of the raw image.

With reference to FIG. 3, in step S1, a raw image comprises a plurality of pixels ("raw" here means "unprocessed", the raw image comprising original and unprocessed data), and then, in the manner of a color filter placed over the image sensor, a "Bayer Pattern" can be obtained as shown in FIG. 2, that is BR/GR (in present embodiment represented as BGb/GrR) format; in other words, when odd-numbered lines of pixels are arranged in BGBGBG form, then the even-numbered lines of pixel information are arranged in GRGRGR form, alternatively, when odd-numbered lines of pixel information are arranged in GRGRGR form, then the even-numbered lines of pixels are arranged in BGBGBG form, where Gb is the G of the BGBG, and Gr is the G of the GRGR.

In step S2, the predetermined sampling width can be 2 pixels, 4 pixels, 8 pixels, or 16 pixels; in the present embodiment, in the horizontal and vertical directions, a sampling width of 2 pixels is used to sample the B, Gb, Gr, and R channels of the raw image, and to obtain corresponding color scale values.

In step S3, the first buffer space and the second buffer space are configured for each of the B, Gb, Gr, and R channels, that is having 4 first buffer spaces and 4 second buffer spaces. A size of the first buffer space and the second buffer space can be arbitrarily set, the buffer size according to the formula:

$$\frac{m}{a} \times \frac{n}{b} \times c,$$

where "m" and "n" represent total row and column pixels of the raw image, separately, "a" represents a sampling width of rows, "b" represents a sampling width of columns, "c" represents a threshold value, the sampling values of "a" and "b" can be equal or unequal. The threshold value "c" can be arbitrarily set, such as 0.01, 0.02, or 0.03. The threshold value includes a maximum threshold value $R_{max}$ and a minimum threshold value $R_{min}$, where $R_{max} = R_{min}$.

The maximum threshold value $R_{max}$ is to obtain a certain number of pixels from the maximum color scale toward a direction that color scale gradually decreases, where a ratio between the total number of the obtained pixels and the total number of pixels of the raw image is the maximum threshold value $R_{max}$. The pixels within a range corresponding to the maximum threshold value $R_{max}$ are the certain number of pixels, which are obtained from the maximum color scale toward a direction that color scale gradually decreases.

The minimum threshold value $R_{min}$ is to obtain a certain number of pixels from the minimum color scale toward a direction that color scale gradually increases, a ratio between the total number of the obtained pixels and the total number of pixels of the raw image is the minimum threshold value $R_{min}$. The pixels within a range corresponding to the minimum threshold value $R_{min}$ are the certain number of pixels, which are obtained from the minimum color scale toward a direction that color scale gradually increases.

In the present embodiment, $R_{max} = R_{min}$, means that both of the number of pixels within the corresponding range of the minimum threshold value $R_{min}$ and the maximum threshold value $R_{max}$ are the same. But, the color scale of the pixels within the corresponding range of the minimum threshold value $R_{min}$ and the maximum threshold value $R_{max}$, their spanned ranges may be different.

In step S4, if 10 bits represents a pixel, then the first buffer space and the second buffer space can store the color scale values in a range of 0~1023. For the first buffer space, since the smaller color scale values need to be collected, the initial color scale value is 1023 ($2^{10}-1$); since the second buffer space has the larger color scale values, the initial color scale value stored in the second buffer space is 0. If 8 bits represents a single pixel, then the first buffer space and the second buffer space can store the color scale values in a range of 0~255. For the first buffer space, since the smaller color scale value need to be collected, the initial value of the first buffer space is 255 ($2^8-1$); since the second buffer space has the larger color scale values, the initial value of the second buffer space is 0.

In step S5, a raw image represented by 6×6 pixels, in the horizontal and vertical directions, a 2 pixel sampling width is used, then each of B, Gb, Gr, and R channels will have nine color scale values. First color scale value of the nine color scale values of the B channel is compared with the initial color scale value stored in the first buffer space which corresponds to the B channel, if first color scale value is less than the color scale value stored in the first buffer space, then the smaller first color scale value is stored, and the larger color scale value stored in the first buffer space is removed.

In step S6, repeat the process, until comparisons of all the nine color scale values are finished, to achieve the minimum color scale value of the nine color scale values being stored in the first buffer space.

Using the same comparison methods, separately compare the nine color scale values of Gb, Gr, and R channels with color scale values stored in the first buffer spaces, and finally store the minimum color scale values in the first buffer spaces. Until the comparisons of the color scale values of all the B, Gb, Gr, and R channels are finished, four minimum color scale values are separately stored in the first buffer space of each channel. To calculate an average value of the four minimum color scale values, the average value represents a reference black for all the channels.

In step S7, referring to step S5, separately compare the nine color scale values of the B, Gb, Gr, and R channels with color scale values stored in the second buffer spaces, and finally store the maximum color scale values in the second buffer spaces. Until the comparisons of the color scale values of all the B, Gb, Gr, and R channels are finished, four maximum color scale values are separately stored in the second buffer spaces of each channel. Then calculate an average value of the four maximum color scale values, and the average value represents a reference white corresponding for all the channels.

In step S9, the CHS method, each of the pixels in the raw image is adjusted according to the reference black and the reference white, the color scale values of the pixels after white balance adjustment is as follow:

$$\frac{C-L}{H-L} \times M,$$

where "C" represents the color scale of each pixel in the raw image, "M" represents 255 or 1023, "H" represents the reference white, and "L" represents the reference black. For example, to calculate the color scale of the R channel after pixel adjustment, the H and L should correspond to the R channel.

In step S2-S8, for the same number of pixels of the raw image, different sampling widths will lead to different numbers of the color scale values of the B, Gb, Gr, and R channels. Conversely, the same sampling width but different numbers of pixels of the raw image, will lead to different numbers of the color scale values of the B, Gb, Gr, and R channels. There is no limit to iterations of the sequence of the step S5 and the step S8; further, in step S5 and step S8, there is no limit to iterations of the sequence of comparisons of the B, Gb, Gr, and R channels.

Figure 4:
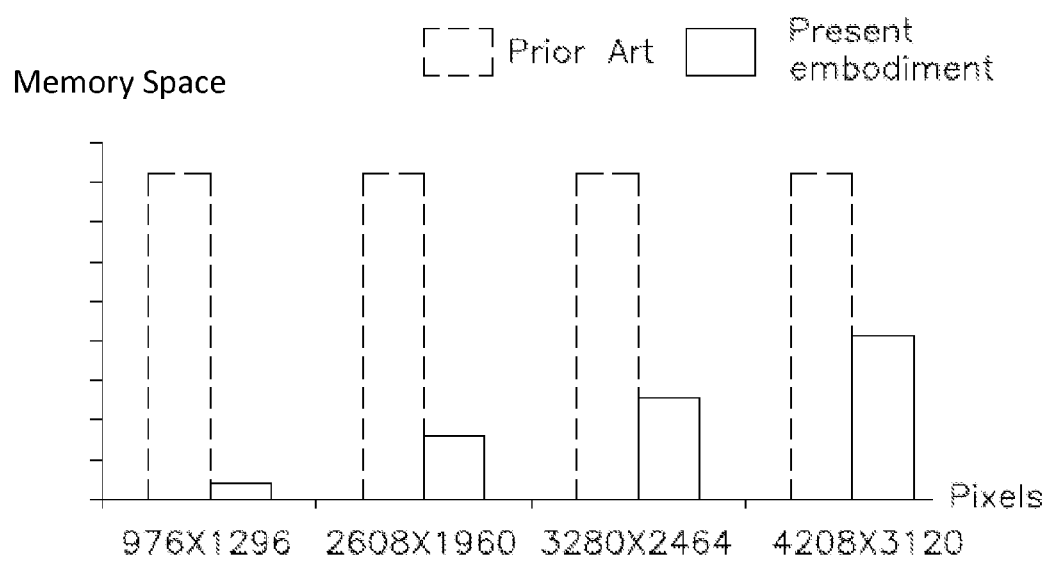
FIG. 4 is a schematic view of required memory space by the present white balance adjustment method, and by the color histogram stretching method of related art.

In present embodiment, the focus is not to save all of the color scale values of the RGB channels, but to store the minimum values and the maximum values, thus saving memory space. In FIG. 4 is a schematic view of required memory space by the present white balance adjustment method, and by the color histogram stretching method of related art, that in 976×1296, 2608×1960, 3280×2464, and 4208×3120 pixels raw images, memory space taken by the present white balance adjustment method is much smaller than using the color histogram stretching method to adjust the white balance.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. A white balance adjustment method of an image capturing device, the method comprising:
   S1: capturing a raw image using the image capturing device, wherein an arrangement format of pixels of the raw image is BGb/GrR;
   S2: sampling the raw image using a predetermined sampling width, obtaining color scale values of B, Gb, Gr, and R channels;
   S3: configuring a first buffer space and a second buffer space of each of the B, Gb, Gr, and R channels, using the first buffer space to store a first color scale value, and using the second buffer space to store a second color scale value that is larger than the first color scale value;
   S4: initializing the first and the second buffer spaces, wherein an initial color scale value stored in the first buffer space is $2^n-1$, an initial color scale value stored in the second buffer space is 0, wherein "n" is a number of bits of the pixel;
   S5: determining whether there is a smaller color scale value of each of the B, Gb, Gr, and R channels than the color scale value stored in respective first buffer space; in response to the determining that there is the smaller color scale value in the B, Gb, Gr, and R channels, storing the smaller color scale value, the larger color scale value being removed from the first buffer space;
   S6: repeating step S5 until a comparison between all of the color scale values in the B, Gb, Gr, and R channels and the corresponding color scale values stored in the first buffer space is complete, and calculating an average value of the color scale values stored in the first buffer spaces, wherein the average value is a reference black;
   S7: determining whether there is a larger color scale value of each of the B, Gb, Gr, and R channels than the color scale value stored in respective second buffer space; in response to the determining that there is the larger color scale value in the B, Gb, Gr, and R channels, storing the larger color scale value, the smaller color scale value being removed from the second buffer space;
   S8: repeating step S7 until a comparison between all of the color scale values in the B, Gb, Gr, and R channels and the corresponding color scale values stored in the second buffer space is completed, and then calculating an average value of the color scale values stored in the second buffer spaces, the average value being a reference white; and
   S9: adjusting the white balance of the raw image, according to the reference black and the reference white and a color histogram stretching (CHS) method.

2. The white balance adjustment method as claimed in claim 1, wherein the sampling width in the horizontal and vertical directions is either 2 pixels, 4 pixels, 8 pixels, or 16 pixels.

3. The white balance adjustment method as claimed in claim 1, wherein size of the first and second buffer spaces is:

$$\frac{m}{a} \times \frac{n}{b} \times c,$$

where "m" and "n" represent total row and column pixels of the raw image, separately, "a" represents a sampling width of rows, "b" represents a sampling width of columns, "c" represents a threshold value.

4. The white balance adjustment method as claimed in claim 1, wherein the color scale value of the pixels after white balance adjustment is as follow:

$$\frac{C-L}{H-L} \times M,$$

where "C" represents a color scale of each pixel in the raw image, "M" represents 255 or 1023, "H" represents the reference white, and "L" represents the reference black.

* * * * *